(12) United States Patent
vonThenen et al.

(10) Patent No.: US 9,355,235 B1
(45) Date of Patent: May 31, 2016

(54) VALIDATING A USER OF A VIRTUAL MACHINE FOR ADMINISTRATOR/ROOT ACCESS

(71) Applicant: EMC Corporation, Hopkinton, MA (US)

(72) Inventors: David vonThenen, Aliso Viejo, CA (US); Darren M. Yee, Lake Forest, CA (US); Steven Kwong, Tustin, CA (US)

(73) Assignee: EMC CORPORATION, Hopkinton, MA (US)

( * ) Notice: Subject to any disclaimer, the term of this patent is extended or adjusted under 35 U.S.C. 154(b) by 0 days.

(21) Appl. No.: 14/099,163

(22) Filed: Dec. 6, 2013

(51) Int. Cl.
*G06F 21/00* (2013.01)
*G06F 21/32* (2013.01)
*G06F 21/57* (2013.01)

(52) U.S. Cl.
CPC ............... *G06F 21/32* (2013.01); *G06F 21/57* (2013.01)

(58) Field of Classification Search
CPC ............................... G06F 21/51; G06F 21/32
USPC ......................................................... 726/18
See application file for complete search history.

(56) References Cited

U.S. PATENT DOCUMENTS

| 7,389,105 | B2 * | 6/2008 | Ala-Laurila | .......... H04M 15/00 455/406 |
| 8,769,614 | B1 * | 7/2014 | Knox | ..................... H04L 63/08 726/3 |
| 8,826,033 | B1 * | 9/2014 | Krishnaprasad et al. | ..... 713/187 |
| 2005/0283614 | A1 * | 12/2005 | Hardt | .................. H04L 63/0823 713/182 |
| 2008/0077979 | A1 * | 3/2008 | Jeffries | ................. H04L 9/3228 726/6 |
| 2008/0195562 | A1 * | 8/2008 | Worth | .................... G06Q 50/06 705/412 |
| 2009/0150213 | A1 * | 6/2009 | Cyr et al. | ......................... 705/10 |
| 2009/0164994 | A1 * | 6/2009 | Vasilevsky et al. | ................ 718/1 |
| 2010/0241850 | A1 * | 9/2010 | Xiong | ..................... G06F 21/35 713/155 |
| 2010/0242104 | A1 * | 9/2010 | Wankmueller | .......... G06F 21/36 726/9 |
| 2012/0110055 | A1 * | 5/2012 | Van Biljon et al. | ........... 709/201 |
| 2012/0290830 | A1 * | 11/2012 | Resch | ................... H04L 9/3093 713/150 |

\* cited by examiner

*Primary Examiner* — Hadi Armouche
*Assistant Examiner* — Ali Shayanfar
(74) *Attorney, Agent, or Firm* — Workman Nydegger (57) ABSTRACT

In one example, a method for controlling access to data includes receiving, by an authenticator, a request from a user for access to a backup of data associated with a computing device. The authenticator then transmits a request that the user identify a shared secret that is unique to the computing device and that is known to the authenticator. When the user is a member of a permissible class of user, the shared secret is accessible by the user. The authenticator then receives a response from the user purporting to identify the shared secret, and the authenticator compares the shared secret identified in the response from the user with the known shared secret. When the shared secret identified in the user response matches the known shared secret, the authenticator grants user access to the backup.

20 Claims, 4 Drawing Sheets

FIG. 4

VALIDATING A USER OF A VIRTUAL MACHINE FOR ADMINISTRATOR/ROOT ACCESS

FIELD OF THE INVENTION

Embodiments of the present invention relate to access control in computing systems and environments. More particularly, embodiments of the invention relate to systems, hardware, computer-readable media, and methods for controlling user access to data backups.

BACKGROUND

Entities often generate and use data that is important in some way to their operations. This data can include, for example, business data, financial data, and personnel data. If this data were lost or compromised, the entity may realize significant adverse financial and other consequences. Accordingly, many entities have chosen to back up critical data so that in the event of a natural disaster, unauthorized access, or other events, the entity can recover any data that was compromised or lost.

Given the importance of the backup data, there may be serious negative consequences for an enterprise whose backup data is compromised in any way. Unfortunately, there are any number of potential threats to the integrity of backup data. One area of ongoing concern is the potential for access, intentional or otherwise, to the backup data by unauthorized personnel. Such personnel may include malicious users. Other personnel, such as employees of the enterprise, may have a legitimate need for access to some aspects of the system, but it may be desirable nonetheless to prevent them from accessing the backup data and to restrict access to users, such as administrators, with a demonstrated need for access.

In light of the foregoing, it would be useful to be able to determine whether a user is an administrator or other authorized personnel so that access can be granted or denied, as applicable, to that user.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention relate generally to access control in computing systems and environments. Some particular example embodiments of the invention relate to systems, hardware, computer-readable media, and methods for controlling user access to data backups in instances where a user may be logged into an operating system running, for example, within a virtual machine (VM) environment. The scope of the invention is not limited to such an environment however, and it will be apparent from this disclosure that embodiments of the invention will find applicability in a variety of other environments as well.

At least some embodiments are concerned with a need to determine whether a user currently logged into an operating system that is running within a VM is an administrator, or other type of user who would have a need for access to one or more backups of that VM. The need to make this determination may arise from a desire to limit, or completely block, access to the backups by unauthorized personnel, such as those who are not administrators. This determination can be made through the use of a variety of authentication mechanisms.

In some example implementations, an authentication process is performed in connection with a shared secret. In these implementations, a secret may be defined as simply as an answer to a question, although it could be defined in a more complex fashion in other embodiments. The user may not know the correct answer, but if the user is a permissible user, such as an administrator for example, the user will be able to obtain the secret. As part of the authentication process, the user submits the secret to the authentication authority for validation and if the secret submitted by the user is validated, the user can then gain access to the information of interest, which may, in some embodiments, comprise one or more backups. On the other hand, if a user is not a permissible user, the user will be unable to obtain the secret, and so cannot be validated for access.

The authentication process may be performed using an authentication authority, which may be a third party in some embodiments. As an added layer of security, some embodiments may also include validation of user credentials. In such embodiments, the user must not only obtain validation of the secret, but must also present a valid user credential which can be validated by the authentication authority. These two processes can be performed in any order.

In operation, a user who desires access to a backup or other information to which access is desired to be restricted can request access or, alternatively, may be prompted by an authentication authority in response to attempted access by the user. In either instance, the user may be presented with a query that corresponds to the shared secret. If the user is a permissible user, that user can then obtain the secret and submit the secret for validation. Upon validation, such as by an authentication authority, access is granted to the user. If the user does not provide the correct secret on the first attempt, or after a certain number of attempts, then validation does not occur and the user is denied access.

Embodiments of the invention, and elements thereof, can be implemented in a variety of different ways, and the scope of the invention is not limited to any particular form(s) of implementation. For the purposes of illustration, some embodiments of the authentication processes disclosed herein are embodied as a piece of software that is external to the system in which the user to be authenticated is working, although this configuration is not required.

As will be evident from the preceding discussion, and other disclosure herein, embodiments of the invention may provide various advantages, although it is not necessary, or required, that any particular embodiment(s), provide any particular advantage(s). Moreover, and consistent with the foregoing, embodiments within the scope of one or more claims may additionally, or alternatively, provide one or more advantages not specifically enumerated herein. As well, to the extent that possible advantages are enumerated herein, those may be present in one or more embodiments in any combination. Finally, any such advantages referred to herein should not be construed to limit the scope of the invention or claims in any way.

At least some embodiments of the invention may enable access control through authentication of a user who may not know or possess the necessary authentication information but who, by virtue of being in a class of permissible users, has sufficient rights to obtain the information necessary for authentication. Thus, if a user is an administrator for example, the user may be able to easily obtain the authentication information, submit the authentication information for validation and, if that information is validated, gain the desired access.

As well, because permissible users need not know, or have, the authentication information, in at least some embodiments, those users are relieved of the burden of having to remember and retain the authentication information. Instead, the authentication information resides in the system. This arrangement may be particularly useful in situations where the authentication information may be changed from time to time.

Finally, in at least some embodiments, the authentication information is not made available, even to permissible users, outside of the system. Thus, there is a reduced risk that the authentication information will fall into the wrong hands.

A. Example Operating Environments

Figure 1:
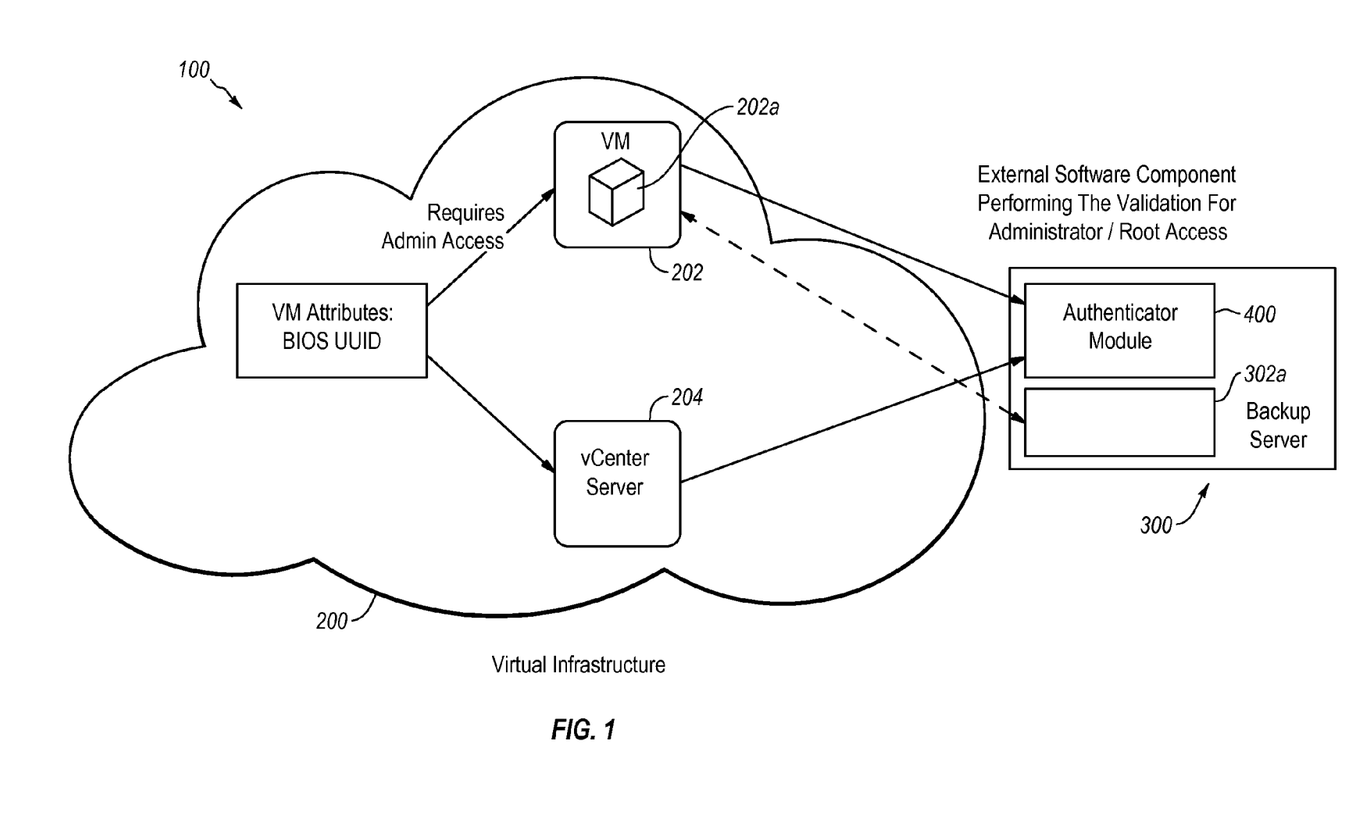
FIG. 1 discloses aspects of an example operating environment for one or more embodiments of the invention.

Embodiments of the invention can be employed in any suitable environment, and the scope of the invention is not limited to any particular environment. FIG. 1 discloses but one example of an operating environment 100 in which one or more embodiments of the invention can be employed. The operating environment 100 may be a network such as a local area network, a wide area network, or any other networked configuration, or a portion of a network. The operating environment 100, some or all of which may constitute a virtual infrastructure, may include various devices including servers and other computers that are interconnected. Moreover, any combination of the elements indicated in the operating environment 100 may be implemented in a cloud or internet environment or other networked environment.

Part or all of the operating environment 100 may be implemented as a virtual infrastructure, although that is not required. The operating environment 100, however implemented, may comprise physical devices, virtual devices, or a combination of both physical devices and virtual devices. Examples of devices that may be implemented in physical and/or virtual form include client devices and servers, such as backup servers for example. Examples of such a backup server include EMC Corporation AVAMAR servers, and EMC Corporation NetWorker servers, although the scope of the invention is not limited to any particular type or implementation of backup, or other, servers. Likewise, the scope of the invention is not limited to any particular type or implementation of client devices. Moreover, the data stored in the operating environment 100 and/or the software running in the operating environment 100 may be cloud based, network based, or single computer based or any combination of the foregoing.

In general, a virtual machine can include a computing device that runs an operating system that can host other operating systems, or multiple copies of itself. As well, a virtual machine may comprise a representation of one or more hardware components that are associated with a plurality of different underlying computing devices. Such hardware components can include, for example, storage media, peripherals, processors, and any of the elements set forth in FIG. 2, discussed below. When presented to a user, for example, the virtual machine can appear as a single entity although it may actually operate using hardware of a plurality of different computing devices. In similar fashion, virtual operating environments and infrastructures can be defined and employed.

With more particular reference now to FIG. 1, details are provided concerning the example operating environment 100. As indicated there, at least a portion of the operating environment 100 is implemented as a virtual infrastructure 200. In the illustrated example, the virtual infrastructure 200 includes one or more clients, such as virtual machine 202, configured for communication with a backup server 300. The virtual machine 202 may include a variety of different components, examples of which are addressed in the discussion of FIGS. 2 and 3. As well, the management server 204 may, in some embodiments, comprise a VMware, Inc. vCenter Server, although that is not required and other types of servers can be used. In general, and as explained in further detail elsewhere herein, the management server 204 handles the management of the secrets that are used for authentication and access to backups, which may reside on the backup server 300 and/or elsewhere.

Among other things, the virtual machine 202 may include a virtual operating system (OS). As well, the virtual machine 202 may include a variety of applications, such as a backup client 202a for example, where the backup client 202a interfaces with a corresponding backup application 302a on the server 300, which may thus comprise a backup server. The backup server 300 may operate in conjunction with the virtual machine 202 to store, for example, one or more backups of the virtual machine 202 and/or backups of other machines which may or may not reside in the operating environment 100, whether those machines are physical or virtual. As disclosed elsewhere herein, at least some users logged into a client, such as the virtual machine 202, may in certain circumstances be able to obtain access to one or more of the backups stored on the backup server 300.

With more particular reference to the backup server 300 and the virtual machine 202, the backup server 300 generally operates to create, or cause the creation of, one or more backups of data that is resident at the virtual machine 202. In some example implementations, the backup server 300 is an EMC Corporation AVAMAR server or NetWorker server, although the scope of the invention is not limited to those example servers. The backup application 302a of the backup server 300 operates in conjunction with the backup client 202a, which is a data de-duplication application in some embodiments, of the virtual machine 202 to backup data residing on storage media associated with the virtual machine 202. The backups thus created, which comprise de-duplicated backups in some embodiments, are stored on the storage media of the backup server 300. The backups may be restored to the virtual machine 202 and/or to any other machines.

With continued reference to FIG. 1, the example backup server 300 hosts an authenticator module 400. In general, the authenticator module 400 may enable users logged onto a machine, such as the virtual machine 202 for example, to access information, such as one or more backups, which may be stored on backup server 300 for example. As indicated in FIG. 1, the backup server 300 on which the authenticator module 400 resides may be external to the virtual infrastructure 200, although this configuration is not necessarily required. The backup server 300 may be configured to communicate with the virtual machine 202 and the management server 204.

Figure 2:
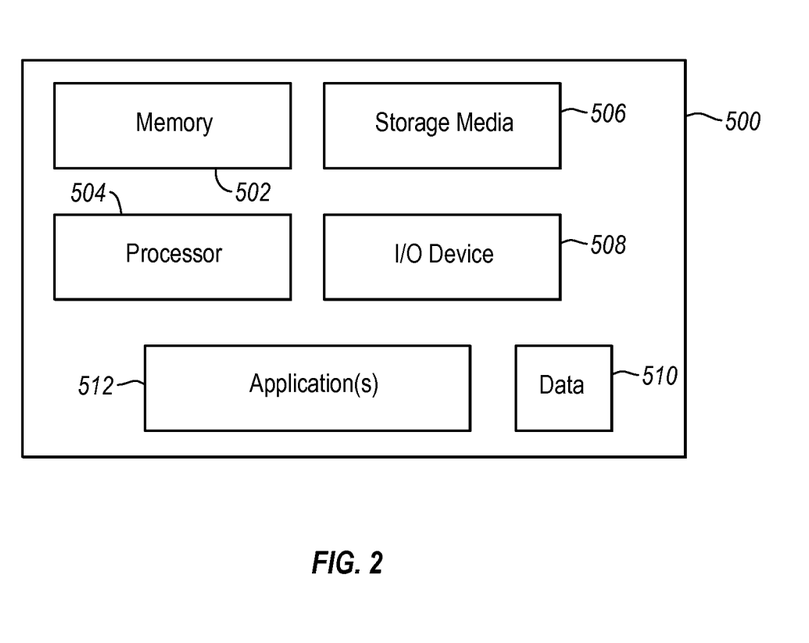
FIG. 2 discloses aspects of an example computing device such as may be employed in connection with one or more embodiments of the invention.

Directing attention briefly now to FIG. 2, and with continued reference to FIG. 1, details are provided concerning aspects of an example computing device 500 such as may be employed in connection with one or more embodiments of the invention. The example computing device 500 may be a virtual device, or a physical device. Thus, any one or more of the virtual machine 202, management server 204, or backup server 300 may include any one or more of the components, in any combination, of the example computing device 500. Moreover, any or all of those components can be physical hardware, or may comprise virtual components.

As indicated in FIG. 2, the computing device 500 includes a memory 502 which may comprise RAM and/or ROM. Computer-executable instructions may be stored in the memory 502 and/or elsewhere in the computing device 500. The computing device 500 may also include one or more processors 504 which may be hardware processors operable to execute computer-executable instructions for performing various processes. As well, the computing device may include storage media 506, I/O device 508, and data storage 510. As well, one or more applications 512 may be provided that comprise executable instructions. One example of such an application 512 is an authenticator module, examples of which are disclosed elsewhere herein.

In at least some instances, the example computing device 500 may comprise a host machine that hosts one or more applications. As such, the computing device 500 can be implemented, by way of example only, as a server (e.g., a file server, an email server), computer (e.g., desktop computers, laptop computers, tablet devices, smartphones), virtual machine, or any combination thereof. Each of the one or more hosts 500 can be associated with its own data. As well, a computing device 500 may generally be any device that includes one or more applications which require communication with devices such as the virtual machine 202, management server 204, and backup server 300. Thus, the computing device 500 may both receive communications from, and transmit communications to, one or more of the virtual machine 202, management server 204 and backup server 300.

B. Cloud Environment

As noted elsewhere herein, embodiments of the invention can be implemented in a variety of different operating environments, one example of which is a cloud computing environment. With attention now to FIG. 3, details are provided concerning one example of such a cloud computing environment 600 in which embodiments of the invention may be implemented.

Figure 3:
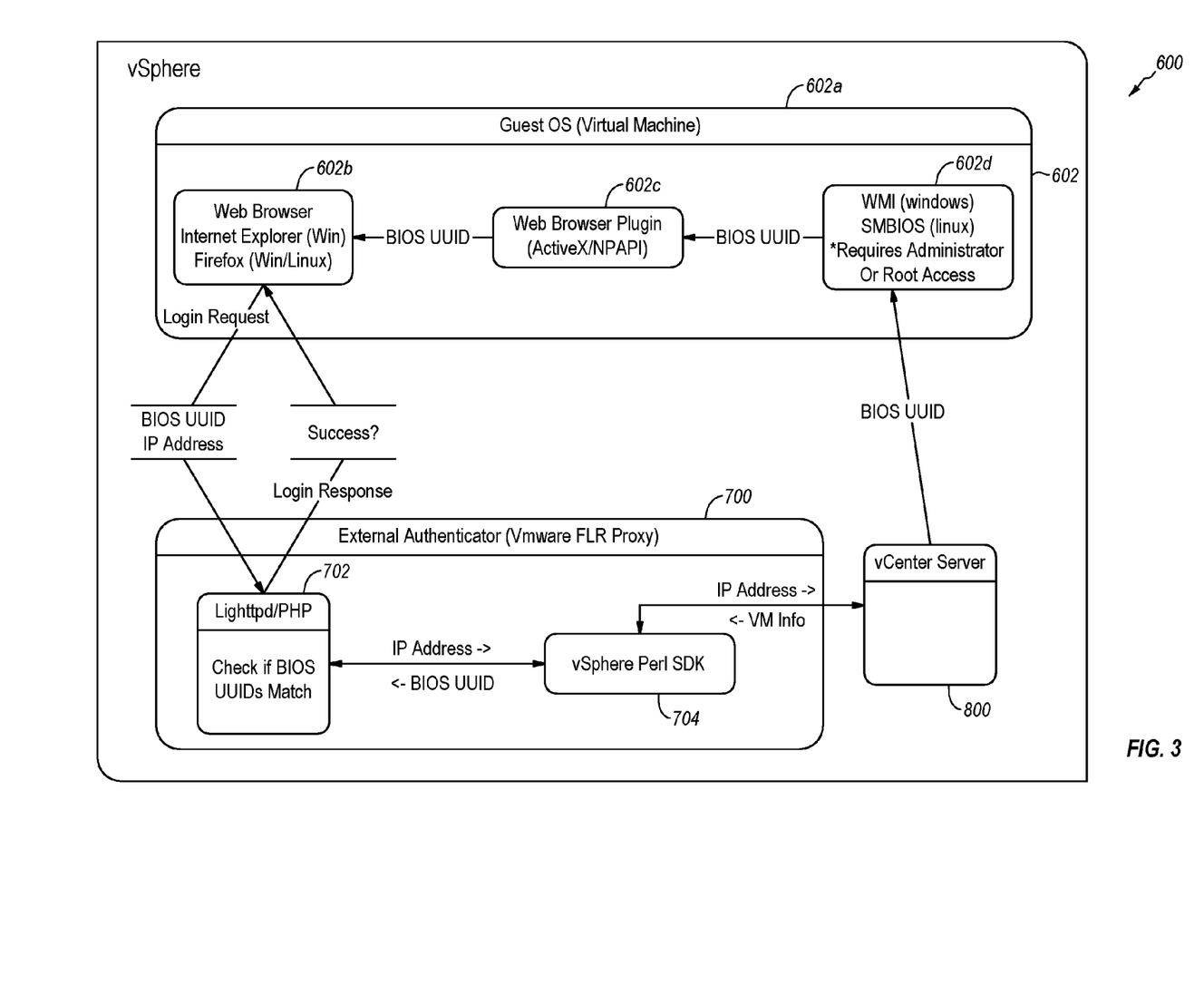
FIG. 3 discloses aspects of a particular example of an operating environment for one or more embodiments of the invention.

Directing attention now to FIG. 3, details are provided concerning one particular example of a cloud computing environment 600 for embodiments of the invention. The cloud computing environment 600 is presented solely by way of example and is not intended to limit the scope of the invention in any way.

In some instances, the cloud computing environment 600 may comprise the VMware, Inc. vSphere environment, although that is not required. As indicated in FIG. 3, the cloud computing environment 600 may include a client, such as virtual machine 602.

The virtual machine 602 may have an operating system, such as guest operating system 602a, and may also include one or more web browsers 602b compatible with the operating system 602a. Examples of web browsers include, but are not limited to, Internet Explorer (IE) compatible with Windows® operating systems, and Mozilla Firefox compatible with Windows® and Linux® operating systems. Where the virtual machine 202 or other client includes a web browser, a user can request validation using the web browser to interface with the authenticator module or other authentication authority, although other interfaces can alternatively be employed and the scope of the invention is not limited to the use of web browsers.

The virtual machine 602 may additionally include one or more web browser plugins 602c to handle various types of content that may be employed in connection with the virtual machine 602. Examples of such plugins include, but are not limited to, the ActiveX plugin, and the Netscape Plugin Application Programming Interface (NPAPI).

As further indicated in FIG. 3, the virtual machine 602 may include a basic system 602d, such as a Basic Input/Output system (BIOS) for example, in the form of executable instructions, that performs, or causes the performance of, certain basic computing system functions, such as a Power-On Self-Test (POST) for example. The basic system 602d may also provide an interface between the operating system 602a and any peripheral devices or systems, and may also facilitate startup of the operating system 602a. As further indicated in FIG. 3, the basic system 602d may be configured such that administrator or root access is required in order for a user to be able to ascertain the secret that must be submitted for authentication.

Various modules, examples of which include System Management BIOS (SMBIOS) and Windows Management Instrumentation (WMI), can be used to read information stored in the BIOS, and the particular module used may correspond to the operating system 602a. By way of illustration, SMBIOS can be used in a Linux operating system environment, and WMI can be used in a Windows operating system environment. Information read from the BIOS by such modules may include, for example, a BIOS Universally Unique Identifier (UUID), as discussed in more detail elsewhere herein. Any other information that uniquely identifies the virtual machine 602 may alternatively be read, and employed in one or more embodiments of the invention.

With continued reference to FIG. 3, an authenticator module 700 may be employed that, as discussed elsewhere herein, enables authentication of a user logged onto the virtual machine 602. The authenticator module 700 can take a variety of forms, one example of which is the VMware, Inc. Vmware FLR Proxy, although the scope of the invention is not limited to this particular example. The authenticator module 700 may include server 702, such as the Lighttpd/PHP HTTP server component for example, that runs on the authenticator module 700 and communicates with the web browser 602b of the virtual machine 602. More specifically, the web browser 602b running on the virtual machine 602 can provide the shared secret, such as the BIOS UUID discussed elsewhere herein, to the HTTP server 702 for validation.

The authenticator module 700, which may or may not be hosted by a backup server such as backup server 300 for example, may further comprise a program interface 704, such as the Vmware, Inc. vSphere Perl SDK program interface for example, to access a management server 800 so as to obtain information, such as the shared secret for example, from the management server 800. Finally, and as noted elsewhere herein, the management server 800 may comprise a VMware vCenter Server, although that is not required.

As indicated in FIG. 3, the server 702 can receive the shared secret information and IP address submitted by a user using the web browser 602b. The IP address corresponds to the virtual machine 602. The shared secret and IP address can be stored in association with each other at the server 702. The program interface 704 may communicate with the management server 800, such as by transmitting the IP address of the virtual machine 602 to the management server 800, to obtain the actual shared secret that corresponds with the virtual machine 602. With reference to one particular example embodiment, the program interface 704 may pass an IP address of the virtual machine 602*a* to the management server 800, and then receive from the management server 800 the shared secret, such as a BIOS UUID for example, that corresponds to that IP address.

The shared secret can then be passed from the program interface 704 to the server 702 that communicates with the web browser 602*b*. The authenticator module 700 can compare the actual shared secret obtained from the management server 800 with the shared secret information submitted by the user of the virtual machine 602 by way of the web browser 602*b*, and then determine whether or not the two match. If the shared secrets match, then the user is granted access by the authenticator module 700 and if the shared secrets do not match, access is denied by the authenticator module 700. Further details concerning some example authentication processes are disclosed elsewhere herein.

C. Example Authentication Processes

Figure 4:
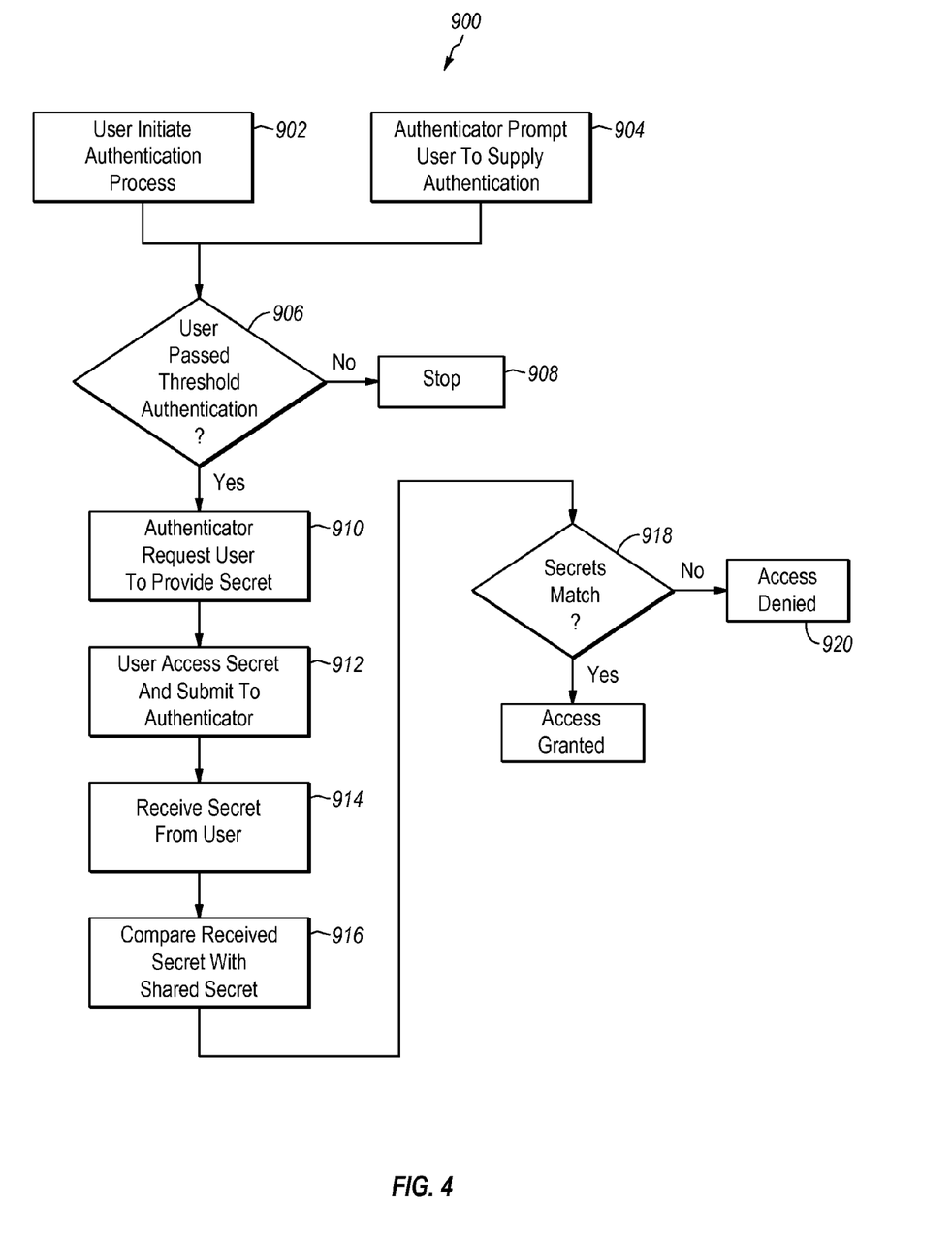
FIG. 4 discloses aspects of a user authentication process according to one or more embodiments of the invention.

Directing attention now to FIG. 4, details are provided concerning an example authentication process 900. The authentication process 900 begins when a user, such as a user logged onto a client which may be a virtual machine for example, either initiates the authentication process by sending 902 an initiation request to an authenticator, or when the user is prompted 904, by an authenticator for example, to begin an authentication process. The prompt may relate to the use of a shared secret. The user may communicate with the authenticator by way of a web-based interface such as a web browser on the virtual machine, although that is not required and other interfaces could be used instead.

In some embodiments, the user may, by virtue of belonging to a particular class or group of users, such as administrators for example, be able to access the secret, even if, prior to the time of access, the user does not know what the secret is and/or or does not possess the secret. In these, and other, embodiments, users that do not belong to this particular class, such as users with only basic access rights for example, do not have access to the secret and, accordingly, cannot be authenticated. Thus, some embodiments may have at least an implicit requirement that the user have already have passed some threshold level of authentication before that user can request and/or obtain authentication by the authenticator.

Accordingly, some embodiments of the authentication process 900 may involve a verification 906 as to whether or not the user has already passed a threshold authentication. As noted above, the verification 906 can be implicit. Alternatively, the verification 906 can be explicit, for example, the authenticator may ask the user to provide a credential, such as might be possessed by an administrator for example, to verify that the user belongs to a particular class or group of users who will be permitted to request authentication from the authenticator. The credential could be a username and/or password, or any other suitable information. If the user does not provide the requested credential, thereby failing the threshold authentication, the process 900 may stop 908, preventing the user from requesting authentication for access to backups or other information.

On the other hand, if the user verifies, such as by submitting a valid credential for example, that the user belongs to a particular class or group of users who will be permitted to request authentication from the authenticator, then the authenticator transmits 910 a request to the user asking the user to supply a secret shared by the authenticator and the virtual machine or other device that the user is logged onto.

In general, the secret can be any information that, when provided by the user to the authenticator, will enable the authenticator to determine whether or not the user should be granted certain access rights. At least some examples of such a secret may have, among others, the following attributes: 1—the user does not know what the correct response to the question should be but the user must be able to access the secret, which can then be passed to a third party for validation; 2—the response given by the user when queried as to the secret is unique amongst possible answers given, so as to avoid collision; and, 3—the shared secret must only be accessible by a mechanism, such as administrator/root level access, that is available only to permissible users.

Information that can serve the function of a secret may include, for example, any one or more of a password, code, key, pass phrase, information characteristic of the machine that is employed by the user, information characteristic of the materials that the user wishes to access, randomly generated information such as randomly generated codes, keys, passwords or pass phrases, or any identifier that uniquely identifies one or more aspects of the machine employed by the user, or the materials that the user wishes to access. The foregoing are presented solely by way of example and are not intended to limit the scope of the invention in any way. It should be noted that in the interest of enhancing security, the shared secret may be changed from time to time. As well, the shared secret may comprise a plurality of shared secrets.

One example of a secret that is used in at least some embodiments of the invention is a universally unique identifier (UUID). A UUID may, in some embodiments at least, conform to the established identifier standard that has been established by the Open Software Foundation (OSF) as part of the Distributed Computing Environment (DCE). In some embodiments, the UUID can be a 16-octet (128-bit) number. A variety of different versions of a UUID can be employed and such versions include, but are not necessarily limited to, Version 1 (MAC address), Version 2 (DCE Security), Version 3 (MD5 hash), Version 4 (random), and Version 5 (SHA-1 hash).

In some particular embodiments of the invention, the secret used by the authenticator to authenticate a user is a BIOS UUID. The BIOS UUID is well suited to serve as a secret, in at least some applications, because it uniquely identifies the machine that the user is using. That is, the BIOS UUID is a part of the descriptor of the configuration of that machine. Where the BIOS UUID is employed as the secret, the BIOS UUID can be obtained by querying the virtual infrastructure in which the machine resides. As suggested above however, the scope of the invention is not limited to the use of UUIDs, or BIOS UUIDs.

Whether it is a BIOS UUID, and/or some other information, the shared secret may reside in a location which can be on, or otherwise associated with, the machine that the user seeking authentication is logged onto.

At least some embodiments of the invention may enable access control through authentication of a user who may not know or possess the necessary authentication information such as a secret but who, by virtue of being in a class of permissible users, has sufficient rights to obtain the information necessary for authentication. Thus, if a user is an administrator for example, the user may be able to easily obtain the authentication information, submit the authentication information for validation and, if that information is validated, gain the desired access.

With continued reference now to the authentication process 900, the user requesting authentication then accesses the secret and submits 912 the secret to the authenticator for validation. In some embodiments, the user may only be able to obtain the secret via administrator access by way of WMI/GetSystemFirmwareTable on Windows, or via root access by reading memory to scan the SMBIOS table. More generally however, the mechanism by way of which the user is able to access the secret may be a mechanism that is only available to users of a particular class, such as administrators for example.

Upon receipt 914 of the secret from the user, the authenticator then compares 916 the received secret with the shared secret and, if those secrets match, the authenticator then grants 918 access to the user. On the other hand, if the secrets do not match, then the authenticator denies 920 access.

As disclosed elsewhere herein, the access granted at 918 may comprise access to one or more backups of a client machine that reside on a backup server, or elsewhere. By implementing an authentication process, embodiments of the invention can restrict access, and thereby afford a level of protection, to backed up data and/or to other data, programs, information, or machines to which it is desired to restrict access.

There are any number of variations to the authentication process 900 within the scope of this disclosure. In one alternative implementation, an authentication process such as the authentication process 900 further includes a requirement for validation of credentials. By way of illustration, one particular alternative implementation of an authentication process additionally requires that a user provide a credential for validation by the authenticating module. Both the credential, and the secret, provided by the user must be validated by the authenticating module before access is granted to the user. The credential and secret can be provided to the authenticator module in any order, or can be provided together. In any event, the additional requirement of validation of the user credential may provide extra security.

D. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modulates running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An access control method, comprising:
   receiving, by an authenticator, a request from a user for access to a backup of data associated with a computing device;
   transmitting, from the authenticator to the user, a request that the user identify a shared secret that is unique to the computing device, wherein the shared secret is known to the authenticator, and wherein the shared secret is not known to the user at the time of the request from the authenticator but the shared secret is obtainable by the user when the user is a member of a permissible class of user, and wherein the shared secret is not obtainable by the user if the user is not a member of the permissible class of user;
   receiving, by the authenticator, a response from the user purporting to identify the shared secret;
   comparing, by the authenticator, the shared secret identified in the response from the user with the known shared secret; and
   granting, by the authenticator, user access to the backup when the shared secret identified in the user response matches the known shared secret.

2. The method as recited in claim 1, wherein the known shared secret is a BIOS UUID of the computing device.

3. The method as recited in claim 1, wherein one or both of the request from the user and the response from the user are generated in connection with operation of a web browser.

4. The method as recited in claim 1, wherein the authenticator receives the request from the user for access to the backup while the user is logged onto the computing device.

5. The method as recited in claim 1, wherein the authenticator denies user access to the backup when the shared secret identified in the user response does not match the known shared secret.

6. The method as recited in claim 1, wherein the response from the user further comprises an IP address of the computing device.

7. The method as recited in claim 1, further comprising performing, by the authenticator, a validation process prior to granting the user access to the backup.

8. A physical storage device having stored therein computer-executable instructions which, when executed by one or more hardware processors of a computing system, control access to backup data, wherein controlling access comprises:
   receiving, by an authenticator, a request from a user for access to a backup of data associated with a computing device;
   transmitting, from the authenticator to the user, a request that the user identify a shared secret that is unique to the computing device, wherein the shared secret is known to the authenticator, and wherein the shared secret is not known to the user at the time of the request from the authenticator but the shared secret is obtainable by the user when the user is a member of a permissible class of user, and wherein the shared secret is not obtainable by the user if the user is not a member of the permissible class of user;
   receiving, by the authenticator, a response from the user purporting to identify the shared secret;
   comparing, by the authenticator, the shared secret identified in the response from the user with the known shared secret; and
   granting, by the authenticator, user access to the backup when the shared secret identified in the user response matches the known shared secret.

9. The physical storage device as recited in claim 8, wherein the known shared secret is a BIOS UUID of the computing device.

10. The physical storage device as recited in claim 8, wherein one or both of the request from the user and the response from the user are generated in connection with operation of a web browser.

11. The physical storage device as recited in claim 8, wherein the authenticator receives the request from the user for access to the backup while the user is logged onto the computing device.

12. The physical storage device as recited in claim 8, wherein the authenticator denies user access to the backup when the shared secret identified in the user response does not match the known shared secret.

13. The physical storage device as recited in claim 8, wherein a virtualization of the physical storage device is accessible by the user.

14. The physical storage device as recited in claim 8, wherein the computing device is a virtual machine (VM).

15. A backup server, comprising:
   a backup application configured to communicate with a backup client on a computing device remote from the backup server;
   one or more hardware processors;
   data storage holding backup data; and
   computer-executable instructions which, when executed by one or more of the hardware processors, control access to backup data, wherein controlling access comprises:
   receiving, by an authenticator, a request from a user for access to a backup of data associated with a computing device;
   transmitting, from the authenticator to the user, a request that the user identify a shared secret that is unique to the computing device, wherein the shared secret is known to the authenticator, and wherein the shared secret is not known to the user at the time of the request from the authenticator but the shared secret is obtainable by the user when the user is a member of a permissible class of user, and wherein the shared secret is not obtainable by the user if the user is not a member of the permissible class of user;
   receiving, by the authenticator, a response from the user purporting to identify the shared secret;
   comparing, by the authenticator, the shared secret identified in the response from the user with the known shared secret; and
   granting, by the authenticator, user access to the backup when the shared secret identified in the user response matches the known shared secret.

16. The backup server as recited in claim 15, wherein a virtualization of the backup server is accessible by the user.

17. The backup server as recited in claim 15, wherein the backup server comprises an element of a cloud computing system.

18. The backup server as recited in claim 15, wherein the backup server communicates with a web browser of the computing device, and communication between the computing device and the authenticator is effected by way of the web browser.

19. The backup server as recited in claim 15, wherein the authenticator receives the request from the user for access to the backup while the user is logged onto the computing device.

20. The backup server as recited in claim 15, wherein the user is not required to know the shared secret in order to gain access to the backup.

\* \* \* \* \*